Patented July 26, 1949

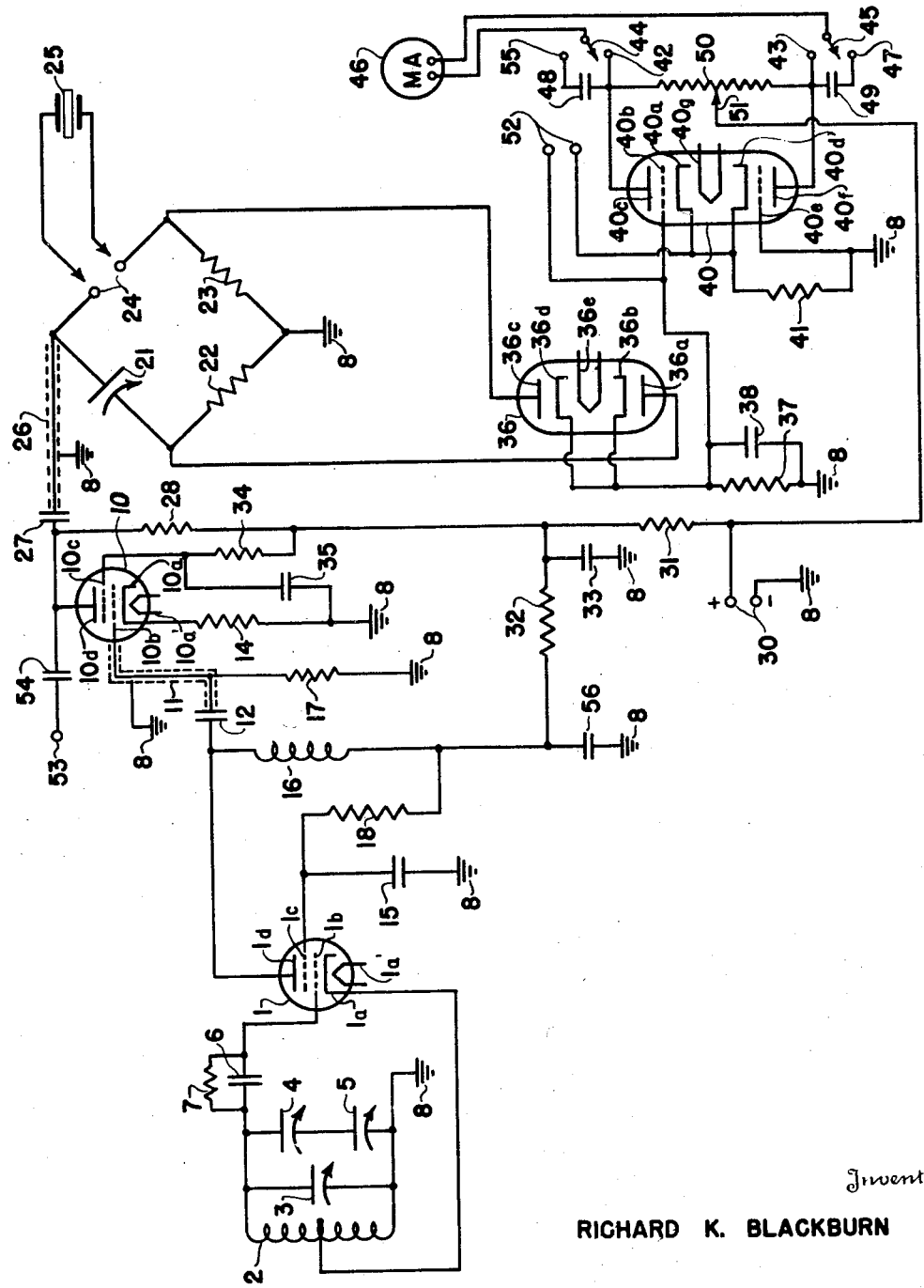

2,476,954

UNITED STATES PATENT OFFICE 2,476,954

APPARATUS FOR DETERMINING RESONANT FREQUENCY OF PIEZOELECTRIC QUARTZ CRYSTAL BLANKS

Richard K. Blackburn, East Hartford, Conn., assignor to Crystal Research Laboratories, Incorporated, Hartford, Conn., a corporation of Connecticut Application October 23, 1945, Serial No. 623,934

4 Claims. (Cl. 175—183)

My invention relates broadly to a measuring method and apparatus and more particularly to a force frequency method and apparatus for determining resonant frequency of piezo electric quartz crystal blanks.

One of the objects of my invention is to provide a method for determining the resonant frequency of piezo electric quartz crystal blanks during the process of grinding such crystals.

Another object of my invention is to provide a circuit arrangement for a balanced bridge circuit in which a crystal in the process of grinding may be introduced and selectively tested for frequency characteristics.

Still another object of my invention is to provide a circuit arrangement for a variable frequency oscillator and associated amplifier and a piezo electric crystal bridge circuit with balanced control means associated with a rectifier and output meter for accurately measuring the frequency characteristics of a piezo electric crystal blank during the successive stages of grinding thereof.

A further object of my invention is to provide a circuit arrangement by which a piezo crystal blank may be scanned over appropriate frequency ranges for determining the resonant frequency of the crystal by an abrupt impedance change which unbalances a bridge circuit and registers the frequency condition on a direct reading meter.

Other and further objects of my invention reside in an arrangement of calibrated bridge circuit and associated measuring system for testing piezo electric crystal blanks as set forth more fully in the specification hereinafter following by reference to the accompanying drawing which schematically shows the circuit arrangement of my invention and illustrates the manner of carrying out the method of my invention.

My invention is directed to a method and apparatus for supplying radio frequency voltage to a piezo electric crystal blank while the blank is electrically connected in a bridge circuit and observing the condition of bridge balance as the frequency of the applied voltage is changed. The frequency is changed from low to high values while observations are being made. It is not necessary that the crystal blank be capable of oscillating in ordinary oscillator circuits.

The system comprises a special variable frequency oscillator; a resistance coupled radio frequency buffer amplifier; a crystal bridge circuit and balance control; a carrier rectifier; a direct current amplifier operating an output meter.

The oscillator is provided with band switching, band set, band spread set, and band spread tuning. The buffer amplifier has no controls. The bridge circuit is provided with a balance control. The direct current amplifier is provided with a zero adjustment.

The system is operated after calibration by placing a piezo crystal or piezo crystal blank in an electrode jig and scanning by it by varying the band spread tuning through appropriate ranges. When the piezo crystal is supplied with energy at the proper frequency, its impedance changes sharply, unbalancing the bridge circuit and allowing the carrier rectifier to supply a direct current voltage to the direct current amplifier. This causes the output meter to move and register a reading. The frequency at which this first indication occurs going from low to high frequency is the useful resonant frequency of the crystal.

Successive indications are secured due to other resonances or modes of operation not used in normal crystal operation. The band spread tuning dial calibrations can be made in steps of as little as one kilocycle and as much as one hundred kilocycles, with the same apparatus. The overall frequency range is of the order of .4 to 15 megacycles, and the usual range per band is two hundred kilocycles with ten kilocycles interval calibrations. The one kilocycle calibration range is about fifty kilocycles per band. The apparatus is provided with six frequency bands, any one of which may be selectively switched into the testing circuit.

Referring to the drawing in detail reference character 1 designates a variable frequency oscillator which may be constituted by a multiple grid tube including cathode 1a, control grid 1b, screen grid 1c and anode 1d. The oscillator includes a tuning circuit constituted by an inductance 2, shunted by a tuning condenser 3 further shunted by independently adjustable condensers 4 and 5. The tuning circuit is connected through series condenser 6 and shunt resistor 7 with control grid 1b of tube 1. The tuning system is connected to ground as represented at 8. A tap 9 on inductance 2 connects to the cathode 1a. A heater electrode 1a' is provided for maintaining cathode 1a at electron emitting temperature.

The output of the variable frequency oscillator 1 is coupled to the input of the resistance coupled radio frequency buffer amplifier 10 which includes cathode 10a, control grid 10b, screen grid 10c and anode 10d. The control grid 10b connects through shielded lead 11 and condenser 12 to the anode 1d. The cathode 10a connects through resistor 14 to ground 8, thereby completing the input circuit to the output circuit of oscillator 1 through ground 8, inductance 2, tap 9 returning to cathode 1a. The coupling circuit between the output circuit of variable frequency oscillator 1 and the input circuit of the radio frequency buffer amplifier 10 is completed through impedance 16, coupling condenser 12 and resistance 17. The circuit extending from screen grid 1c and the end of impedance 16 includes resistance 18. A by-pass condenser 15 connects to a point intermediate space charge grid 1c and resistance 18 and the ground 8.

The shielded lead 11 has the shield thereof connected to ground as represented at 8. Cathode 10a is maintained at electron emitting temperature through heating electrode 10a'.

The output of the buffer amplifier 10 connects to the bridge circuit represented at 20. The bridge circuit comprises a balanced electrical system having an electrically tunable arm containing variable condenser 21 and a high resistance arm containing resistance 22 balanced against a high resistance arm containing resistance 23 and an arm 24 containing connections to an electrode jig into which the piezo crystal blank 25 may be quickly electrically connected or disconnected in performing electrical tests on the piezo crystal blank. The upper terminal of the bridge circuit 20 is connected through shielded lead 26 and condenser 27 to the anode 10d of the radio frequency buffer amplifier 10. The opposite end of the bridge circuit 20 is connected to ground 8, completing a return path to the cathode 10a through resistor 14 associated with buffer amplifier tube 10. A resistor 28 constitutes part of the coupling means between the output of buffer amplifier tube 10 and the balanced bridge circuit 20. The power supply for the anode systems of oscillator and buffer amplifier 10 are completed from the source of potential 30 through the impedance 31 and impedance 32 whereby the positive terminal of high potential source 30 connects to anode 1d and anode 10d with filter connections to ground through condensers 33 and 56 connected on the one side to the anode circuits and on the other side to ground 8.

The screen grid 10c of buffer amplifier tube 10 is connected through resistance 34 with the lower terminal of resistor 28. A by-pass condenser 35 connects between an intermediate point between screen grid 10c and resistance 34 and ground 8.

The output of the balanced bridge is connected to a dual rectifier 36, including anode 36a, associated cathode 36b and anode 36c and associated cathode 36d. The anodes 36a and 36d connect to the output terminals of the balanced bridge 20. The output of the rectifier connects between cathodes 36b and 36d and the ground 8, the said output including resistance 37 shunted by condenser 38. A heater electrode 36e maintains the cathodes 36b and 36d at electron emitting temperature.

A direct current amplifier connects across the output of the resistance 37, constituting the output of the dual rectifier 36 as shown. The connections of dual rectifier tube 36 are such that the resistor 37 alternately receives the rectified voltage across resistor 22 to ground and the rectified voltage across resistor 23 to ground from the output of the Wheatstone bridge circuit. This direct current amplifier comprises a duplex three electrode tube 40 having one set of electrodes consisting of cathode 40a, control grid 40b and anode 40c and another set of electrodes consisting of cathode 40d, control grid 40e and anode 40f. The cathodes 40a and 40d are maintained at electron emitting temperature by heater 40g. The input circuit to the direct current amplifier is coupled to the output circuit of the dual rectifier 36 through the circuit provided by resistor 41 connected at one end to ground 8 and control grid 40e and at the other end to the cathodes 40a and 40d. The output circuit from the output circuit 40 extends from anodes 40c and 40f to contacts 42 and 43. Movable switch arms 44 and 45 leading to the meter 46 may establish selective connection with contacts 42 and 43 or adjacent contacts 55 and 47. Contacts 55 and 47 connect through condensers 48 and 49 with opposite ends of the resistance 50. A movable tap 51 on resistance 50 connects to the positive side of potential source 30. Suitable compensating potentials may be introduced at terminals 52 to effect the required bias of the grid circuits of the amplifier 40 for assuring balanced operation.

Any external frequency which is to be introduced into the circuit for beating with oscillations generated by oscillator 1 is applied to terminal 53 through the 10 micro-microfarad condenser 54.

While not intending to limit the circuit of my invention to the use of any particular types of electron tubes, I have successfully used the 6V6 tube in the positions 1 and 10 for the oscillator and buffer amplifier and I have successfully used the 6H6 tube as the rectifier 36 and the 6SN7 tube as the direct current amplifier tube 40.

In the circuit arrangement illustrated I have used the following values for the circuit elements with very favorable results:

| | |
|---|---|
| Variable condenser 3 | 200 microfarads |
| Condenser 4 | 100 microfarads |
| Variable condenser 5 | 50 microfarads |
| Resistance 7 | 25 ohms |
| Condenser 6 | .00025 microfarad |
| Condenser 15 | .01 microfarad |
| Resistance 18 | 50 ohms |
| Impedance 16 | 2.5 microhenries |
| Condenser 34 | 10 microfarads |
| Condenser 12 | .001 microfarad |
| Resistance 50 | 50 ohms |
| Resistance 14 | 500 ohms (10 watt) |
| Condenser 35 | .01 microfarad |
| Resistance 28 | 50 ohms |
| Condenser 54 | 10 micro-microfarads |
| Resistance 32 | 20 ohms |
| Condenser 33 | 10 microfarads |
| Condenser 27 | .001 microfarad |
| Variable condenser 27 | 50 microfarads |
| Resistance 22 | 10 ohms |
| Resistance 23 | 10 ohms |
| Resistance 37 | 1 megohm |
| Condenser 38 | .01 microfarad |
| Resistance 31 | 25 ohms |
| Resistance 41 | 10 ohms |
| Condenser 47 | 2 microfarads |
| Condenser 48 | 2 microfarads |

The heating current is supplied to the cathodes of all the tubes at 6.3 volts and the plate potential is supplied at the source 30 at 250 volts subject to reduction through the resistance leading to the plate circuits of the respective tubes.

The piezo crystal blank 25 is mounted in a detachable jig which may be inserted in one arm of the bridge circuit 20 for subjecting the piezo crystal blank to test over the frequency range determined by the oscillator 1, such as a range of .4 to 15 megacycles with a range per band of 200 kilocycles with 10 kilocycle interval calibrations. The bridge balance is changed as the frequency applied to the crystal sweeps through the resonant frequency of the crystal, enabling the crystal to take control of the direct current amplifier circuit and register a reading on meter 46. Thus an accurate determination of frequency of the piezo crystal blank may be quickly obtained from a reading of the precalibrations provided on the condenser scales associated with condensers 3, 4 and 5 and condenser 27.

While I have described my invention in one of its preferred embodiments I realize that modifications may be made and I intend no limitations upon my invention other than may be imposed by the scope of the appended claims.

What I claim as new and desire to secure by Letters Patent of the United States is as follows:

1. In a circuit for determining frequency of piezo electric crystal blanks, an oscillator variable over the frequency range inclusive of the probable frequency of a piezo electric crystal blank under observation, a Wheatstone bridge circuit operative over the frequency range of said oscillator, said circuit including separate impedance arms, means for detachably inserting a piezo electric crystal under observation in one arm of said Wheatstone bridge circuit, means for impressing oscillations from said variable frequency oscillation circuit across two of the impedance arms of said Wheatstone bridge circuit, a dual rectifier comprising a pair of rectifier elements, one of which is series connected with one impedance arm of said Wheatstone bridge circuit and the other of which is series connected with another of said impedance arms, and a measuring circuit connected with the output of said dual rectifier said Wheatstone bridge circuit being normally balanced over the frequency range of said oscillation system and being unbalanced at the point at which the frequency of said oscillation system crosses the resonant frequency of said piezo electric crystal blank for effecting an operation of said measuring circuit and determining thereby the resonant frequency of the piezo electric crystal blank.

2. An apparatus for checking the frequency of piezo electric crystal blanks comprising a Wheatstone bridge circuit having a pair of resistive arms, a capacitive arm and an arm arranged to detachably receive a piezo electric crystal blank under test, means for supplying a variable frequency across said capacitive arm and one of said resistive arms in series, said Wheatstone bridge circuit being responsive over a wide frequency range embracive of the probable frequency of the piezo electric crystal blank under test, a dual rectifier comprising a pair of diodes one of which is series connected with one of said resistive arms and the other of which is series connected with the other of said resistive arms of said Wheatstone bridge circuit and an observing circuit connected with the output of said dual rectifier whereby the point at which impressed variable frequency crosses the resonant frequency of the piezo electric crystal under test is registered by said observing circuit.

3. An apparatus for checking the frequency of piezo electric crystal blanks comprising a Wheatstone bridge circuit having a pair of resistive arms, a capacitive arm and an arm arranged to detachably receive a piezo electric crystal blank under test, means for supplying a variable frequency across one of said resistive arms and said capacitive arm of said Wheatstone bridge circuit, a dual rectifier comprising a pair of electron discharge systems one of which is individual to each of said resistive arms, and an observing circuit connected with the output of said dual rectifier whereby the point at which said variable frequency crosses the resonant frequency of said piezo electric crystal blank under test may be observed for determining the resonant frequency of said piezo electric crystal blank.

4. An apparatus for checking the frequency of piezo electric crystal blanks comprising a Wheatstone bridge circuit having a pair of resistive arms, a capacitive arm and an arm arranged to detachably receive a piezo electric crystal blank under test, means for supplying a variable frequency across a path formed by one of said resistive arms and said capacitive arm in series, a balanced dual rectifier including a pair of diodes, one of said diodes being connected in series with one of said resistive arms and the other of said diodes being connected in series with the other of said resistive arms, a common output circuit leading from said diodes, an amplifier connected with said common output circuit, a balanced meter control circuit connected with the output of said amplifier, and a measuring instrument connected with said balanced meter control circuit whereby the point at which said variable frequency crosses the resonant frequency of said piezo electric crystal blank is indicated on said measuring instrument for indicating the frequency of said piezo crystal blank.

RICHARD K. BLACKBURN.

REFERENCES CITED

The following references are of record in the file of this patent:

Hund, High Frequency Measurements, McGraw-Hill; First Ed., 1933, pp. 430–432. Copy in Div. 48.

Hague, A. C. Bridge Methods; Pitman, 4th Ed., 1938, pp. 294–295. Copy in Div. 48.